United States Patent [19]
Cooper

[11] Patent Number: 5,946,030
[45] Date of Patent: Aug. 31, 1999

[54] APPARATUS AND METHOD FOR ELECTRONIC IMAGE CENTERING

[75] Inventor: Alan Neal Cooper, Coppell, Tex.

[73] Assignee: Texas Instruments Incorporated, Dallas, Tex.

[21] Appl. No.: 08/184,794

[22] Filed: Jan. 21, 1994

[51] Int. Cl.$^6$ .................................................... H04N 5/225
[52] U.S. Cl. ........................................... 348/172; 348/208
[58] Field of Search ................................... 348/172, 208, 348/170, 169, 143

[56] References Cited

U.S. PATENT DOCUMENTS

| | | | |
|---|---|---|---|
| 4,539,590 | 9/1985 | Gage | 348/172 |
| 4,717,958 | 1/1988 | Gal et al. | 348/208 |
| 5,060,074 | 10/1991 | Kinugasa et al. | 348/208 |

*Primary Examiner*—Victor R. Kostak
*Attorney, Agent, or Firm*—Alan K. Stewart; Wade James Brady, III; Richard L. Donaldson

[57] ABSTRACT

The apparatus and method (10) are applied to an image sensor (26) having an image area (32) for receiving light to form a first predetermined number of lines of image data. In certain image sensors (40, 100), a storage area (44, 108) is coupled to the image area (42, 106) for receiving a second predetermined number of lines of image data from the image area (42, 106) in response to an image area gate signal. A serial register (68, 110, 126) is further coupled to the storage area (44, 108) for receiving successive lines of image data therefrom in response to a STORAGE AREA GATE signal, and the serial register (68, 110, 126) further serially outputs the successive lines of image data in response to a SERIAL REGISTER GATE signal. The image centering command input from an operator is generated by and received from a vertical and horizontal adjust input device (12, 14) that generates a vertical adjust value and a horizontal adjust value indicative of the amount of adjustment needed for centering the image. A timing controller (24) is further coupled to the image sensor (26) and the vertical and horizontal adjust input device (12, 14) to generate the IMAGE AREA GATE, STORAGE AREA GATE, SERIAL REGISTER GATE signals, a plurality of display timing signals, and also to determine the timing relationships between the signals in response to the vertical and horizontal adjust values.

16 Claims, 4 Drawing Sheets

APPARATUS AND METHOD FOR ELECTRONIC IMAGE CENTERING

CROSS-REFERENCE TO RELATED APPLICATIONS

This application is related to:

U.S. patent application Ser. No. 08/185,663 Attorney Docket No.14943 (32350-0929), entitled APPARATUS AND METHOD OR FOCAL PLANE ZOOM AND PAN, filed Jan. 21, 1994.

TECHNICAL FIELD OF THE INVENTION

This invention relates in general to the field of electronic imaging systems. More particularly, the present invention relates to apparatus for electronic image centering and a method for performing the same.

BACKGROUND OF THE INVENTION

Many applications of electronic imaging systems require an accurate alignment of the optical assembly and the electronic image sensor so that an object in the center of field of view is accurately positioned in the center of the resultant display. This misalignment is commonly called the bore sight error.

Typically, the bore sight error is corrected by a rough positioning and/or screw down of the image sensor die and then manually adjusting its position in the horizontal, vertical and sometimes rotational axes by using fine alignment rails and readjusting the fastening screws. Since in a typical image sensor, the dimension of one pixel is approximately eight microns, accurate manual physical alignment is difficult and nearly impossible. Therefore, the manual alignment process is often slow, tedious, expensive and unsatisfactory in producing accurate results.

SUMMARY OF THE INVENTION

In accordance with the present invention, apparatus and method for electronic image centering is provided which substantially eliminate the disadvantages associated with manual image sensor adjustments to accurately correct bore sight errors.

In one aspect of the invention, the apparatus is applied to an image sensor having an image area for receiving light to form a first predetermined number of lines of image data. In certain image sensors, a storage area is coupled to the image area for receiving a second predetermined number of lines of image data from the image area in response to an image area gate signal. A serial register is further coupled to the storage area for receiving successive lines of image data therefrom in response to a storage area gate signal, and the serial register further serially outputs the successive lines of image data in response to a serial register gate signal.

The image centering command input from an operator is generated by and received from a vertical and horizontal adjust input device that generates a vertical adjust value and a horizontal adjust value indicative of the amount of adjustment needed for centering the image. A timing controller is further coupled to the image sensor and the vertical and horizontal adjust input device to generate the image area gate, storage area gate, serial register gate signals, a plurality of display timing signals, and also to determine the timing relationships between the signals in response to the vertical and horizontal adjust values.

In another aspect of the invention, the method for centering image data applies to sensors in which the image data in the image sensor are transferred to a serial register in response to a first clock signal, and the image data are then serially read from the serial register to a video processor in response to a second clock signal. The image data are then displayed in response to display timing signals. The image centering input are received in the form of vertical and horizontal adjust values. The timing relationship between the image data transferring step and the displaying step for shifting the image in the vertical axis are then altered in response to the vertical adjust value. Further in response to the horizontal adjust value, the timing relationship between the serially reading step and the displaying step is modified for shifting the image in the horizontal axis.

In yet another aspect of the present invention, the method for centering the image includes the steps of generating a first predetermined number of lines of image data with a first predetermined width in an image sensor, transferring a second predetermined number of consecutive lines of image data from the image sensor. The second predetermined number is generally less than the first predetermined number so that the read image data composes a vertically shifted and centered image. To compose a horizontally shifted and centered image, the second predetermined number of consecutive lines of image data are serially transferred to a video display, where the serial transfer is advanced or delayed with respect to horizontal line display timing signals.

BRIEF DESCRIPTION OF THE DRAWINGS

For a better understanding of the present invention, reference may be made to the accompanying drawings, in which.

DETAILED DESCRIPTION OF THE INVENTION

The preferred embodiment of the present invention and its advantages are best understood by referring to FIGS. 1–10 of the drawings, like numerals being used for like and corresponding parts of the various drawings.

Figure 1:
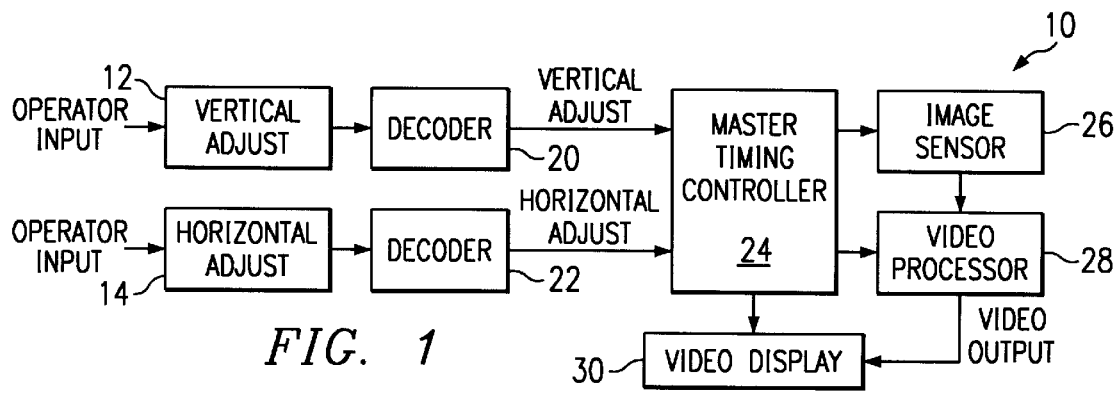
FIG. 1 is a simplified top level block diagram of an embodiment of the present invention.

Referring to FIG. 1, apparatus for electronic image centering 10 employs vertical and horizontal adjust devices 12 and 14 to receive and separate the amount of adjustment desired in both axes. Vertical and horizontal adjust devices 12 and 14 may be any suitable manually operable input device, such as binary coded decimal switches, potentiometers, or may represent vertical and horizontal adjustment inputs from a microprocessor. Accordingly, vertical and horizontal adjust devices 12 and 14 produce outputs that represent the amount of adjustment in the vertical and horizontal axes, or the amount of up and down adjustment and the amount of left and right adjustment. The outputs from vertical and horizontal devices 12 and 14 may require decoders 20 and 22 to decode into digital signals or outputs, which are then provided to a master timing controller 24. For example, vertical and horizontal devices 12 and 14 may be implemented with four-bit binary coded decimal switches, the output of which may be decoded by decoders 20 and 22 into 16 positional adjustment inputs to master timing controller 24. The electronic image centering step may be performed as one of the last steps in the manufacturing assembly process, where a predetermined test pattern, such as the Electronic Industries Association (EIA) test pattern, is used to locate the center of the displayed image.

Master timing controller 24 generates the timing signals required to capture the light image from an image sensor 26, the timing signals internal to image sensor 26 for reading the image, the timing signals needed to operate a video processor 28, the timing signals needed to operate a video display 30, and the timing signals needed to transfer the image data between these components. The details of these timing signals are described below.

Figure 2:
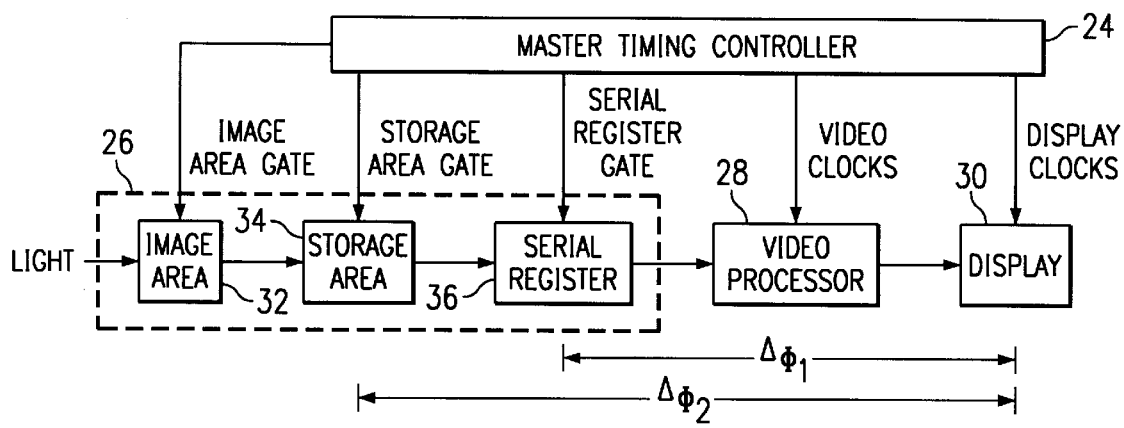
FIG. 2 is a simplified block diagram setting forth the principle of the present invention.

Because implementation is slightly different for different image sensor technologies, it is instructional to describe apparatus for electronic image centering in principle. Referring to FIG. 2, as light impinges on an image area 32 of image sensor 26, image data is generated therein. In certain image sensors, the image data in image area 32 is then clocked by an IMAGE AREA GATE clock signal to transfer the image data in a parallel manner out of image area 32 and into a storage area 34. Storage area 34 holds the image data temporarily as light continues to impinge on image area 32. Storage area 34 is clocked by a STORAGE AREA GATE clock signal that moves the image data line-by-line into a serial register 36. The serial output of serial register 36 to video processor 28 is controlled by a SERIAL REGISTER GATE clock signal. The image data is then processed and provided to display 30, which is controlled by DISPLAY CLOCKS.

As shown in FIG. 2, master timing controller 24 produces these timing signals to image sensor 26, video processor 28, and display 30. As will be clear from the discussion below, electronic image centering involves altering the timing relationships between these timing signals. In principle, shifting the image in the horizontal and vertical axis involves changing the timing relationship between the SERIAL REGISTER GATE and DISPLAY CLOCKS, and STORAGE AREA GATE signals and the DISPLAY CLOCKS and/or associated display timing signals. To shift the image along the vertical axis, the timing of STORAGE AREA GATE signal relative to the video display timing for displaying a frame is either advanced or delayed. To shift the image along the horizontal axis, the timing of SERIAL REGISTER GATE signal relative to the video display timing for displaying a horizontal line of image is either advanced or delayed.

In particular, when image data is produced in image area 32, it occupies certain "lines" and "columns" or pixel areas therein. If there is a bore sight error, then the center of the image data is not coincident with the center of image area 32. Instead of mechanically moving and manipulating the physical position of image sensor 26, the timing of the image data being transferred to storage area 34, and the timing of the image data being transferred from storage area 34 and/or serial register to video processor 28 in relationship with the video and/or display clock signals are manipulated to achieve electronic image centering. In essence, by manipulating timing, only the portion of image data that constitutes a centered image is read out and ultimately made available to be displayed. This centering method uses image sensors with a larger than required image area, so that centering may be done by shifting, in limited amounts, in the vertical and horizontal axes to obtain the centered image.

Figure 3:
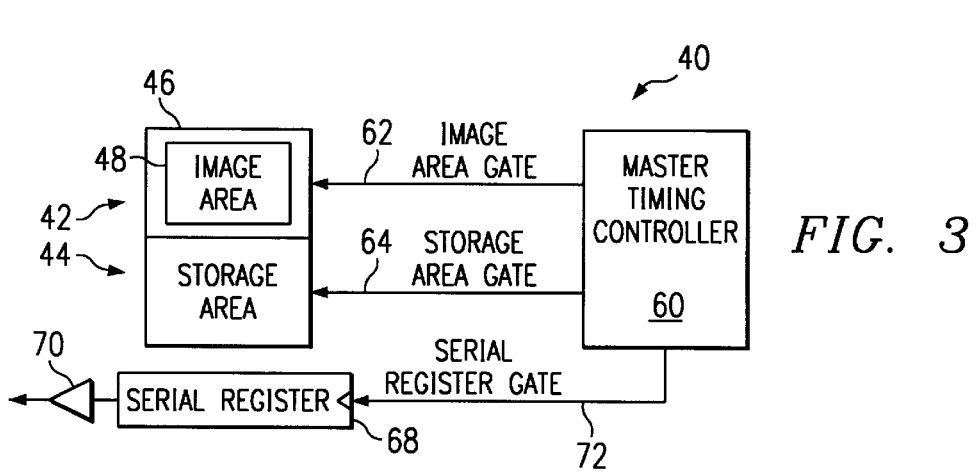
FIG. 3 is a simplified block diagram of an embodiment of the present invention as applied to a frame transfer image sensor.

Referring to FIG. 3, apparatus for electronic image centering 10 as applied to a frame transfer charge-coupled device (CCD) image sensor 40 is shown. Frame transfer image sensor 40 includes an image area 42 and a separate storage area 44. As shown, image area 42 includes an outer boundary 46 representing the actual size of image area 42, and an inner boundary 48 representing the ultimate size of the displayed image, where the area between boundaries 46 and 48 represents the amount of shifting in both axes that is permissible to center the image. A serial register 68 is further coupled to storage area 44, and an amplifier 70 is coupled to serial register 68 from which the image data is serially read out to the video processor.

For charge-coupled devices, electron-hole pairs are generated by the light during a time-period typically termed "integration time". The generated electrons are held in potential wells in the semiconductor as electron charge in image area 42 and then quickly transferred in parallel into storage area 44 timed by the IMAGE AREA GATE clock signal 62. The image data in storage area 44 is then read out one line at a time into serial register 68 timed by the STORAGE AREA GATE clock signal 64. Finally, the SERIAL REGISTER GATE clock signal 72 clocks the output from serial register 68. As shown, the timing signals 62, 64, and 72 are generated by a master timing controller 60.

Figure 4:
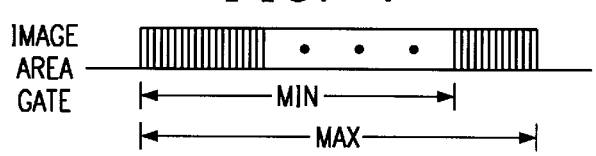
FIG. 4 is a simplified timing diagram showing an embodiment of vertical centering for a frame transfer image sensor.

Referring to FIG. 4, the method by which image centering in the vertical axis is shown. Recall that image data in the form of electron charges are transferred in parallel from image area 42 into storage area 44 (FIG. 3). Each pulse of IMAGE AREA GATE clocks and moves all packets of charge or horizontal lines of pixel data down one line-position. If inner boundary 48 includes 244 horizontal lines of pixel data representing the minimum amount of parallel transfer, and outer boundary 46 includes 260 lines of pixel data representing the maximum amount of parallel transfer, then their difference, or sixteen, represents the amount of change that is permitted to vertically shift the image. Stated in another manner, a maximum of eight lines of shifting upward and eight lines downward is permitted. The size of storage area 44 need not be enlarged with respect to the display size, and therefore may have 244 horizontal lines in this example.

In operation, if no shifting is desired, then 252 IMAGE AREA GATE clock pulses, or 260 minus 8, are used to transfer the image data contained within inner boundary 48 into storage area 44. If the image is not centered but must be shifted downward, then a number of clock pulses greater than 252 but less than or equal to 260 should be used, depending on the amount of shifting desired. Note that because images are flipped as light impinges on image area 42, shifting the image downward is actually an upward shift of the image pixels in storage area 44. If an upward shift is desired to center the image, then a number of IMAGE AREA GATE clock pulses greater than or equal to 244 and less than 252 should be used for the parallel transfer of image data from image area 42 to storage area 44.

Figure 5:
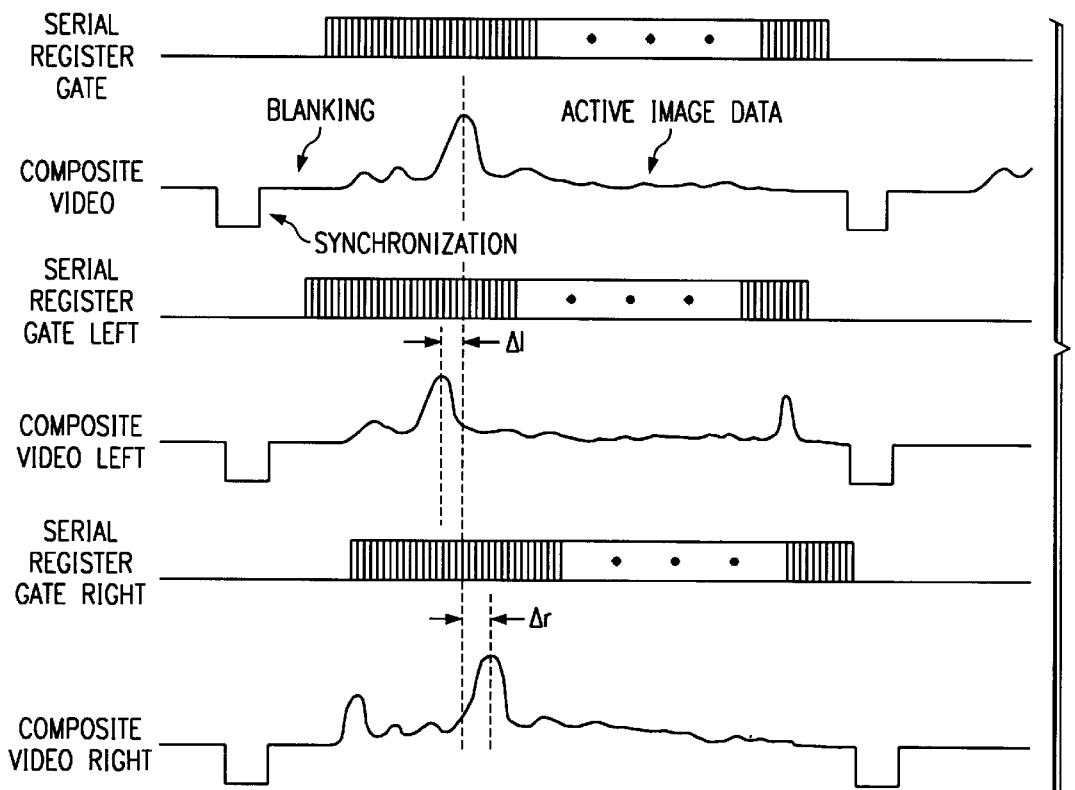
FIG. 5 is a simplified timing diagram showing an embodiment of horizontal centering.

Referring to FIG. 5, a timing diagram illustrates image center in the horizontal axis. In principle, horizontal shifting of the image involves changing the timing relationship between the time image data are read from serial register 68 (FIG. 3) and the synchronization pulses in a COMPOSITE VIDEO signal. A COMPOSITE VIDEO signal includes synchronization pulses that synchronize transmitter and receiver scanning, blanking pulses that makes horizontal retracing to the beginning of the line invisible, and the active image information readout that produce the picture. Each synchronization pulse, blanking pulse, and active image data represents one horizontal scanning line on the display.

As shown in the timing diagram, normally the read out from serial register, as indicated by SERIAL REGISTER GATE pulses, is timed so that the image data fall within the active image read out window. However, image centering in the horizontal axis may be achieved by altering the timing relationship. If shifting toward the left is needed to correct the bore sight error, the SERIAL REGISTER GATE clock pulses may be started later by an amount corresponding to the amount of shifting desired. Note that since the image is flipped, the left side of the actual picture image is actually in the right side of the image area. This results in discarding the rightmost image data in the serial register and using the data between the left inner and outer boundaries 48 and 46. Conversely, if shifting toward the right is needed, the SERIAL REGISTER GATE clock pulses may be started earlier by an amount corresponding to the amount of shifting desired and thus discarding the leftmost image data in the serial register. Similar to centering in the vertical axis, the amount of shifting permissible in either direction is dependent on the relative sizes of image area 42 and the display.

Figure 6:
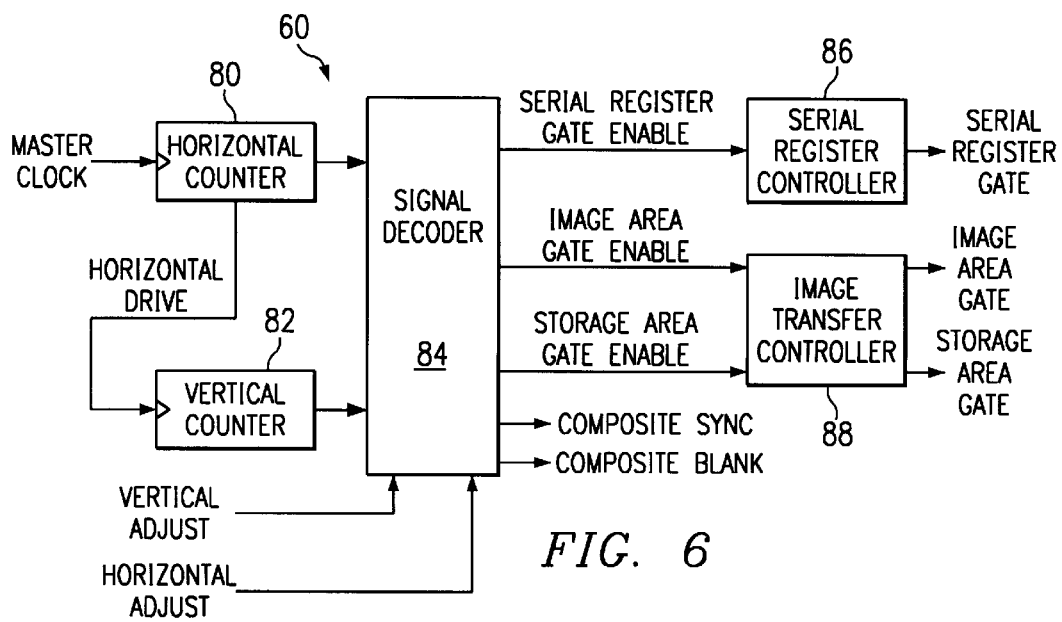
FIG. 6 is a simplified block diagram of an embodiment of a timing controller.

Referring to FIG. 6, a more detailed block diagram of an embodiment of master timing controller 60 is shown. A MASTER CLOCK signal is used to drive a horizontal counter circuit 80. Horizontal counter circuit 80 is used to address the position within a single line of a video image. Horizontal counter circuit 80 generates a horizontal count value which is provided to a signal decoder 84. Horizontal counter circuit 80 increments its count value as driven by the MASTER CLOCK signal until it reaches a predetermined maximum value and resets. Upon resetting, a HORIZONTAL DRIVE signal is generated and provided to a vertical counter circuit 82. Vertical counter circuit 82 increments its vertical count value each time a horizontal counter circuit 80 resets and produces a HORIZONTAL DRIVE signal. The vertical count value addresses the number of lines in a video frame and also is provided to signal decoder 84. Signal decoder 84 uses the vertical and horizontal counter values to determine when vertical and horizontal blanking periods occur. Additionally, signal decoder 84 generates video signals such as the composite video signal, composite synchronization signal, and composite blanking signals as known in the art.

In addition, VERTICAL and HORIZONTAL ADJUST are provided to signal decoder 84 for indicating the amount of shifting desired in both axes. From these two adjustment values, signal decoder 84 generates a set of enable signals, including SERIAL REGISTER GATE ENABLE, IMAGE AREA GATE ENABLE, and STORAGE AREA GATE ENABLE. These enable signals indicate the desired timing relationship between the corresponding clock signals and the video signals for centering the image. The enable signals are provided to a serial register controller 86 and an image transfer controller 88, which in turn generate the necessary SERIAL REGISTER GATE, IMAGE AREA GATE, and STORAGE AREA GATE clock signals.

Figure 7:
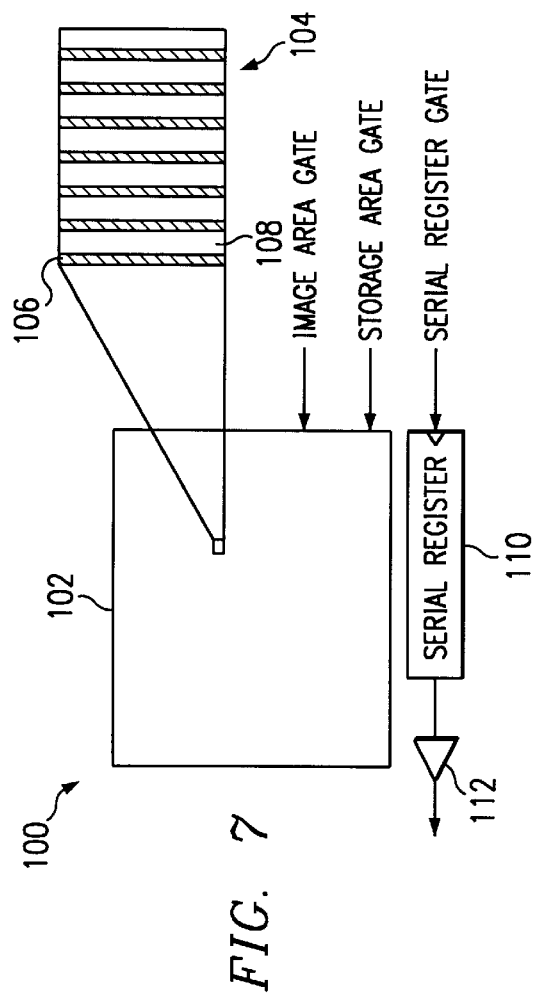
FIG. 7 is a simplified block diagram of the present invention as applied to an interline transfer image sensor.

Referring to FIG. 7, an interline or interdigitated charge-coupled device image sensor 100 is shown. Because of structural differences, the application of apparatus for electronic image centering 10 is slightly different than that for a frame transfer image sensor. As shown in an enlarged portion 104, interline image sensor 100 has an image and storage area 102 where single-pixel wide image area sections 106 are interlaced with single-pixel wide storage area sections 108. Therefore, instead of multiple IMAGE AREA GATE clock pulses to shift all of the image data from the image area into the storage area, only one clock pulse is needed to accomplish the same. Once the image data are in storage area 108, the image data are then transferred line-by-line as timed by a STORAGE AREA GATE signal into a serial register 110. Similarly, the output from serial register 110 is timed by a SERIAL REGISTER GATE clock, and amplified by an amplifier 112.

Figure 8:
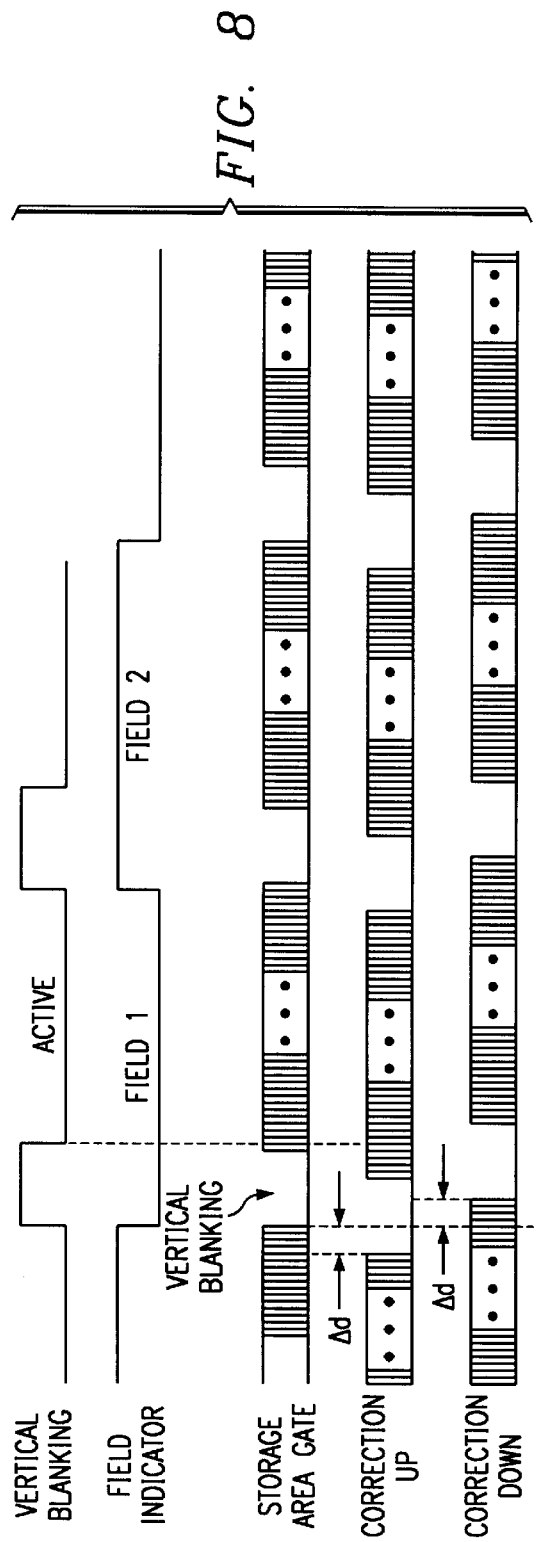
FIG. 8 is a simplified timing diagram showing an embodiment of vertical centering for an interline transfer image sensor.

Since, as in a frame transfer image sensor, a serial register is used, the method and technique for centering the image in the horizontal axis remain the same. Therefore, the timing diagram shown in FIG. 5 is equally applicable to interline image sensor 100. Referring to FIG. 8, a timing diagram illustrating electronic image centering in the vertical axis for interline image sensor 100 is shown. Basically, shifting of the image upward or downward involves changing the timing relationship between STORAGE AREA GATE signal and the VERTICAL BLANKING pulses and/or the FIELD INDICATOR signal. VERTICAL BLANKING pulses indicate when the scanning beam is turned off at the end of a frame to allow it to sweep back up to the upper left corner of the display. The FIELD INDICATOR indicates the timing for each frame of picture from the first line to the last line. Therefore, if STORAGE AREA GATE clocks the transfer of image data from storage area 108 before the end of the VERTICAL BLANKING pulse, the earlier lines of data are lost. The net effect is an upward shift of the resultant displayed image. Conversely, a delay in the start of STORAGE AREA GATE results in a downward shift of the displayed image. As discussed above, the amount of shifting in either direction is controlled by the vertical and horizontal adjust inputs in order to correctly center the image. Note that this method may also be applied to a frame transfer image sensor to achieve centering in the vertical axis.

Figure 9:
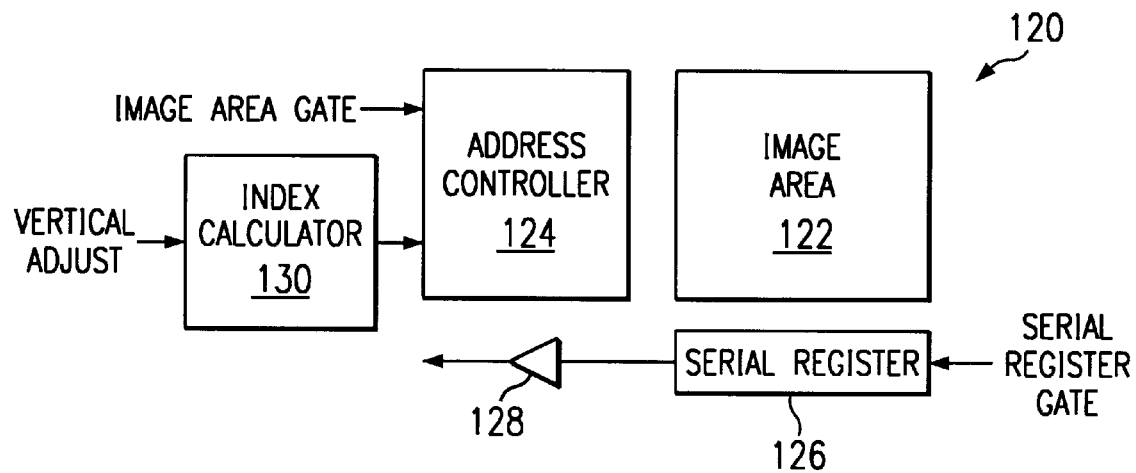
FIG. 9 is a simplified block diagram of the present invention as applied to a line addressable image sensor.

Referring to FIG. 9, yet another image sensor technology 120 is shown. Image sensor 120 is a MOS-based sensor with an image area 122 that is line addressable by an address controller 124. Therefore, each line of image data may be selectively read out to a serial register 126 by presenting the correct address for that line. An amplifier 128 also may be used at the output of serial register 126. Since a serial register 126 is used to serially read out each line of image data, the method and technique for horizontal centering depicted in FIG. 5 and described above in conjunction therewith are similarly applicable to line addressable image sensor 120. The timing of SERIAL REGISTER GATE is shifted with respect to the COMPOSITE VIDEO signal to effect shifting of the image to the left and right.

Figure 10:
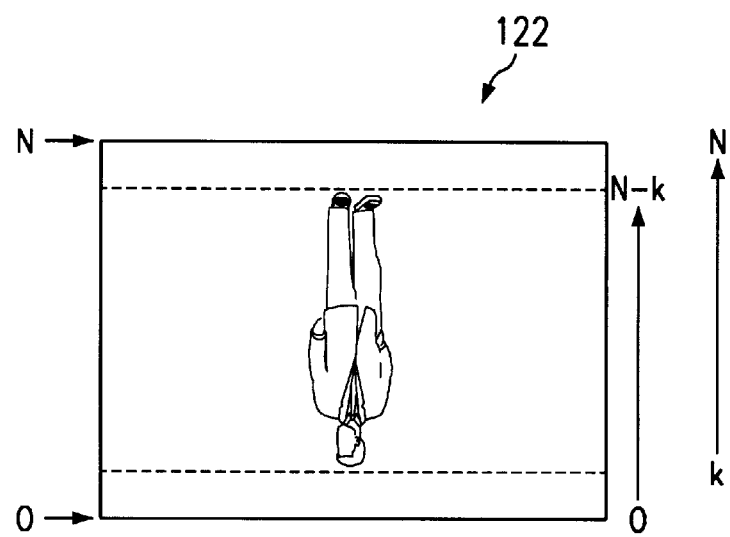
FIG. 10 is a diagram showing an embodiment of vertical centering for a line addressable image sensor.

Referring also to FIG. 10, to center the image in the vertical axis, the lines addressable feature of image sensor 120 are utilized. An index calculator 130 is included to compute which lines of image area are to be read out to effect centering in the vertical axis in response to the vertical adjust input. For example, if contains 0 to N lines, to shift an image upward, image data in lines 0 to N-k may be used, where k represents the maximum amount of shifting allowed. Similarly, to shift an image downward, image data in lines k to N may be used. Therefore, image area 122 is oversized in the vertical axis by k lines.

Although the present invention and its advantages have been described in detail, it should be understood that various changes, substitutions and alterations can be made therein without departing from the spirit and scope of the invention as defined by the appended claims.

What is claimed is:

1. Apparatus for image centering, comprising:
   an image sensor having an image area for receiving light to form a first predetermined number of lines of image data;
   a storage area coupled to said image area for receiving a second predetermined number of lines of image data from said image area in response to an image area gate signal;
   a serial register coupled to said storage area for receiving successive lines of image data therefrom in response to a storage area gate signal, said serial register further serially outputting said successive lines of image data in response to a serial register gate signal;
   a vertical adjust signal and a horizontal adjust signal indicative of the amount of adjustment needed for centering said image; and
   a timing controller coupled to said image sensor and said vertical and horizontal adjust signals, said timing controller generating said image area gate, storage area gate, serial register gate signals, a plurality of display timing signals, and determining timing relationships therebetween in response to said vertical and horizontal adjust signals.

2. The apparatus, as set forth in claim 1, wherein said timing controller comprises:
   a signal decoder circuit for receiving said vertical and horizontal adjust signals and a horizontal count and a vertical count corresponding to timing for displaying a horizontal line and a frame respectively, said signal decoder generating a serial gate enable, an image area gate enable, storage area gate enable signals, and video display signals in response thereto;
   a serial register controller coupled to said signal decoder circuit for generating said serial register gate signal in response to said serial register gate enable signal; and
   an image transfer controller coupled to said signal decoder circuit for generating said image area gate and storage area gate signals in response to said image area gate enable and storage area gate enable signals.

3. The apparatus, as set forth in claim 1, wherein said timing controller generates said image area gate signal having a second predetermined number of pulses, said second predetermined number being greater than said first predetermined number for shifting said image upward.

4. The apparatus, as set forth in claim 1, wherein said timing controller generates said image area gate signal having a second predetermined number of pulses, said second predetermined number being less than said first predetermined number for shifting said image downward.

5. The apparatus, as set forth in claim 2, wherein said signal decoder circuit delays or expedites the generation of said serial register gate enable signal relative to said video display signals in response to said horizontal adjust sianal indicating a right and a left shift respectively.

6. The apparatus, as set forth in claim 2, wherein said signal decoder circuit delays or expedites the generation of said storage area gate enable signal relative to said video display signals in response to said vertical adjust signal indicating a downward and a upward shift respectively.

7. The apparatus, as set forth in claim 1, further comprising:
   an address controller coupled to said image area for addressing and reading specific lines thereof; and
   an index calculator coupled to said address controller for generating a vertical shift index in response to said vertical adjust signal, said address controller generating shifted address values in response to said vertical shift index.

8. A method for centering image data representing an image in an image sensor, comprising the steps of:
   transferring said image data in said image sensor to a serial register in response to a first clock signal;
   serially reading said image data from said serial register to a video processor in response to a second clock signal;
   displaying said image data in response to display timing signals;
   receiving vertical and horizontal adjust values;
   altering the timing relationship between said image data transferring step and said displaying step for centering said image in the vertical axis in response to said vertical adjust value; and
   altering the timing relationship between said serially reading step and said displaying step for centering said image in the horizontal axis in response to said horizontal adjust value.

9. The method, as set forth in claim 8, further comprising the steps of:
   parallel transferring image data in an image area to a storage area in response to an image area gate signal having a predetermined number of pulses;
   transferring said image data in said storage area in response to a storage area gate signal; and
   increasing said predetermined number of pulses of said image area gate signal to shift said image upward and decreasing said predetermined number of pulses of said image area gate signal to shift said image downward in response to said vertical adjust value.

10. The method, as set forth in claim 8, further comprising the steps of:
    receiving light composing a predetermined test pattern to form a corresponding image on said image sensor;
    generating said vertical adjust value in response to said test pattern being off center in the vertical axis; and
    generating said horizontal adjust value in response to said test pattern being off center in the horizontal axis.

11. The method, as set forth in claim 8, wherein said vertical shifting step includes the step of altering the timing relationship between said image data transferring step and a video display timing signal associated with displaying an entire frame of image data for shifting said image in the vertical axis in response to said vertical adjust value.

12. The method, as set forth in claim 8, wherein said horizontal shifting step includes the step of altering the timing relationship between said serially reading step and a video display timing signal associated with displaying a horizontal line of image data for shifting said image in the horizontal axis in response to said horizontal adjust value.

13. The method, as set forth in claim 8, further comprising the steps of:
    addressing and reading selected consecutive lines of image data from said image sensor in response to said vertical adjust value; and displaying said selected lines of image data.

14. A method for centering an image, comprising the steps of:

generating a first predetermined number of lines of image data with a first predetermined width in an image sensor;

providing a vertical adjust signal;

transferring a second predetermined number of consecutive lines of image data from said image sensor in response to said vertical adjust sianal, said second predetermined number being less than said first predetermined number, said read image data composing a vertically shifted and centered image;

providing a horizontal adjust signal; and serially transferring said second predetermined number of consecutive lines of image data to a video display, and advancing or delaying said serial transfer with respect to horizontal line display timing signals for composing a horizontally shifted and centered image in response to said horizontal adjust sianal.

15. The method, as set forth in claim 14, wherein said second predetermined number of lines of image data transferring step comprises the step of advancing or delaying said transferring step with respect to frame video display timing signals.

16. The method, as set forth in claim 14, wherein said second predetermined number of lines of image data transferring step comprises the steps of:

determining selected lines of image data for centering said image along the vertical axis in response to said vertical adjust values; and addressing and reading said selected lines of image data.

* * * * *